(12) United States Patent
Noguchi

(10) Patent No.: US 9,071,758 B2
(45) Date of Patent: Jun. 30, 2015

(54) IMAGE CAPTURE APPARATUS HAVING IMAGE STABILIZATION FUNCTION AND CONTROL METHOD FOR SAME

(71) Applicant: CANON KABUSHIKI KAISHA, Tokyo (JP)

(72) Inventor: Masaaki Noguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 176 days.

(21) Appl. No.: 13/722,196

(22) Filed: Dec. 20, 2012

(65) Prior Publication Data

US 2013/0162850 A1    Jun. 27, 2013

(30) Foreign Application Priority Data

Dec. 27, 2011 (JP) ................. 2011-286631

(51) Int. Cl.
*H04N 5/232* (2006.01)

(52) U.S. Cl.
CPC ........ *H04N 5/23287* (2013.01); *H04N 5/23248* (2013.01); *H04N 5/23264* (2013.01); *H04N 5/23251* (2013.01); *H04N 5/23245* (2013.01)

(58) Field of Classification Search
None
See application file for complete search history.

(56) References Cited

U.S. PATENT DOCUMENTS

| | | | |
|---|---|---|---|
| 2009/0160952 A1* | 6/2009 | Nakakuki et al. | 348/208.4 |
| 2011/0115929 A1* | 5/2011 | Noguchi | 348/208.4 |
| 2012/0092511 A1* | 4/2012 | Wakamatsu | 348/208.2 |
| 2012/0093493 A1* | 4/2012 | Wakamatsu | 396/55 |
| 2013/0004151 A1* | 1/2013 | Wakamatsu | 396/55 |
| 2013/0163972 A1* | 6/2013 | Miyazawa | 396/55 |

FOREIGN PATENT DOCUMENTS

JP    2001-078137    3/2001

* cited by examiner

*Primary Examiner* — Justin P Misleh
(74) *Attorney, Agent, or Firm* — Cowan, Liebowitz & Latman, P.C.

(57) ABSTRACT

The present disclosure relates to an image capture apparatus and a control method for the same, with which a moving picture captured for a specific length of time before or after the capture of a still picture can be recorded during still picture capture. The image capture apparatus has a first image stabilization mode and a second image stabilization mode in which a shake component not corrected in the first image stabilization mode can be corrected, and has an image stabilization function that performs image stabilization on the basis of shake of the image capture apparatus. The image stabilization function performs image stabilization without using the second image stabilization mode when the moving picture is buffered, which allows stable image stabilization to be utilized during the capture of a recorded moving picture.

16 Claims, 3 Drawing Sheets

IMAGE CAPTURE APPARATUS HAVING IMAGE STABILIZATION FUNCTION AND CONTROL METHOD FOR SAME

BACKGROUND

1. Field of the Disclosure

The present disclosure relates to an image capture apparatus and a control method for the same, and more particularly relates to an image capture apparatus having an image stabilization function, and a control method for this apparatus.

2. Description of the Related Art

Among cameras capable of recording both still pictures and moving pictures, there is a known digital camera having a function of recording a still picture along with a moving picture captured for a specific length of time before and after capture of the still picture (Japanese Patent Laid-Open No. 2001-78137).

Meanwhile, image stabilization technology is widely used in digital cameras, but more recently there has also been a known technique for correcting not only rotational shake (shake in the elevation angle (depression angle) direction or the azimuth angle direction), but also correcting the translational shake or parallel shake that occurs when the camera moves horizontally. A technique for correcting camera shake that tends to occur under certain imaging conditions has also been proposed. For example, there is a fixed point photography correction function that allows for powerful correction of shake with a small amplitude and a low frequency, which occurs during stationary telephoto imaging, and a large shake correction function that expands the movable region of an image stabilization lens on the wide angle side. Effective image stabilization can be accomplished by using these various image stabilization techniques according to the imaging situation.

With the prior art disclosed in Japanese Patent Laid-Open No. 2001-78137, since the user determines the timing of still picture capture, the start timing for a moving picture recorded along with the still picture cannot be known in advance. If a translational shake function or fixed point photography correction function is activated in a state in which a moving picture of a specific duration from just before is buffered for using moving picture recording, then the image stabilization effect appears to be at work in the live-view image displayed on the EVF, but the position of the image stabilization lens reaches the movable limit more readily.

When the image stabilization lens moves in a certain direction from the center of the movable range and reaches the movable limit in that direction, it should be readily understood that any further movement in that direction cannot be corrected for shake as required. When the image stabilization lens has reached the movable limit or is located near the movable limit in any direction at the start timing of a recorded moving picture, the captured moving picture will be recorded in a state of diminished image stabilization capability.

SUMMARY

With the present disclosure, image stabilization that is stable during the capture of a recorded moving picture can be utilized in an image capture apparatus, and a control method for this apparatus, with which a moving picture captured for a specific length of time before or after the capture of a still picture can be recorded during still picture capture.

According to an aspect of the present invention, there is provided an image capture apparatus having an image capture mode in which a moving picture captured for a specific length of time before or after capture of a still picture is also recorded along with the still picture, the apparatus comprising: a memory unit that buffers a specific time component of a continuously captured moving picture; and an image stabilization control unit that performs image stabilization with an image stabilization unit according to shake of the apparatus, the image stabilization control unit having a first image stabilization mode and a second image stabilization mode in which a shake component not corrected in the first image stabilization mode can be corrected, wherein the image stabilization control unit performs image stabilization without using the second image stabilization mode when the specific time component being buffered by the memory unit.

According to another aspect of the present invention, there is provided a control method for an image capture apparatus comprising memory unit that buffers a specific time component of a continuously captured moving picture, and having an image capture mode in which a moving picture captured for a specific length of time before or after capture of a still picture is also recorded along with the still picture, the control method comprising: an image stabilization control step in which image stabilization is performed with image stabilization unit according to shake of the apparatus, wherein in the image stabilization control step, of a first image stabilization mode and a second image stabilization mode in which a shake component not corrected in the first image stabilization mode can be corrected, image stabilization is performed without using the second image stabilization mode when the specific time component being buffered into the memory unit.

Further features of the present disclosure will become apparent from the following description of exemplary embodiments with reference to the attached drawings.

DESCRIPTION OF THE EMBODIMENTS

Exemplary embodiments of the present invention will now be described in detail in accordance with the accompanying drawings.

Figure 1:
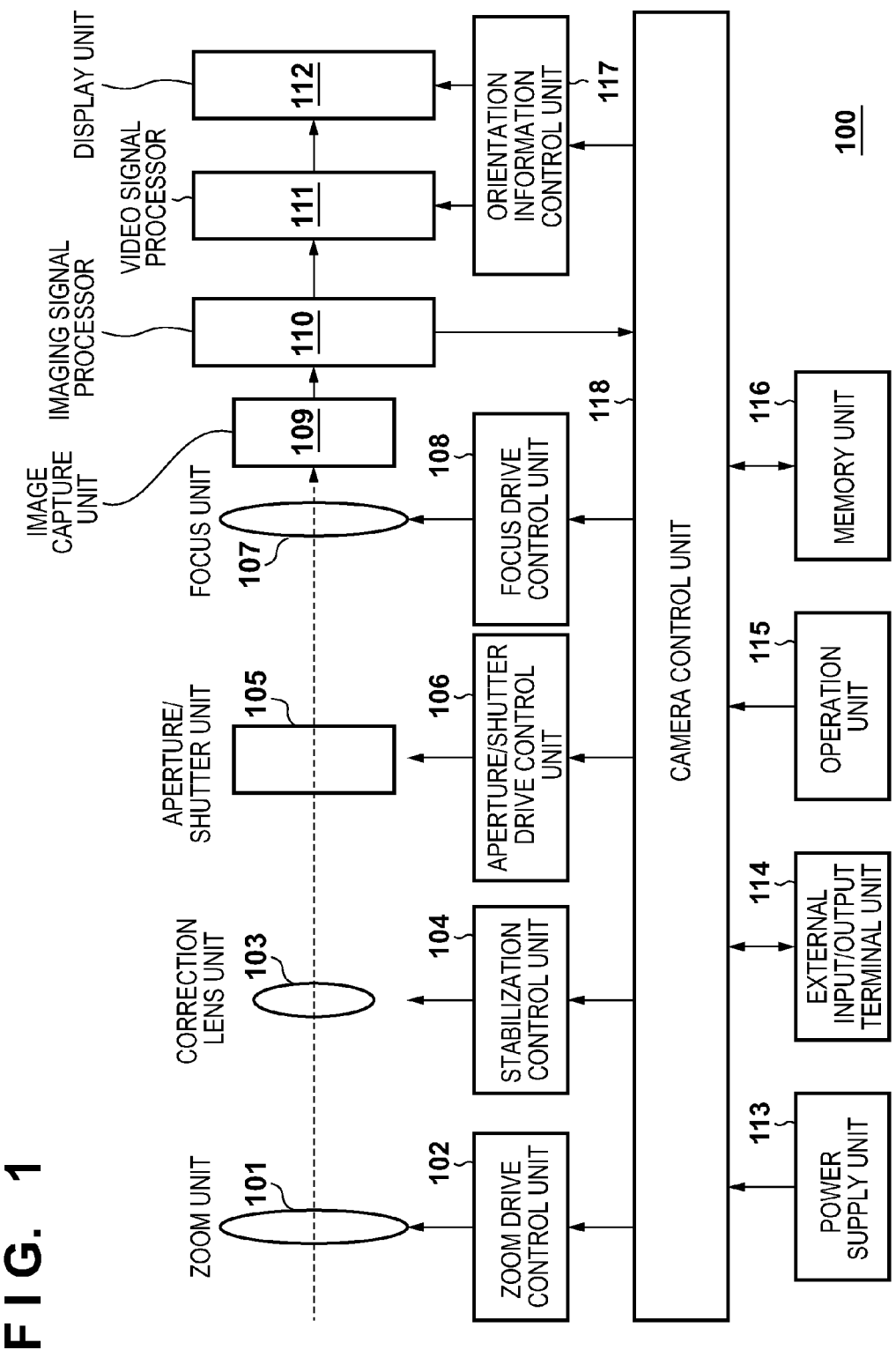
FIG. 1 is a block diagram of an example of the configuration of a digital still camera, as an example of an image capture apparatus according to an embodiment of the present invention.

FIG. 1 is a block diagram of an example of the configuration of a digital still camera, as an example of an image capture apparatus according to an embodiment of the present invention. The present invention can be applied to any image capture apparatus that has the function of recording a moving picture captured for a specific length of time before or after the capture of a still picture, along with the still picture, and that can utilize an image stabilization function that provides better image stabilization than the image stabilization function used for ordinary imaging under specific imaging conditions. The present invention can also be applied to any device equipped with this image capture apparatus. Also, the imaging lens may be one that is removable.

In FIG. 1, 101 is a zoom unit, which includes a zoom lens. A zoom drive control unit 102 controls the drive of the zoom unit 101 that performs zooming. A correction lens (shift lens)

unit 103 has a correction lens capable of moving perpendicular to the optical axis, and the correction lens has a circular movable region of a specific size centered on the optical axis, for example. A stabilization control unit 104 detects shake of a digital still camera 100 with an angular velocity sensor or an acceleration sensor, and controls the drive of the correction lens so as to correct blurring of the captured image caused by camera shake. How the stabilization control unit 104 drives the correction lens (the range or pattern over which the correction lens is driven) can be controlled according to image stabilization parameters set by a camera control unit 118 (discussed below) in the stabilization control unit 104. Also, a parameter set corresponding to a plurality of image stabilization functions that can be executed by the stabilization control unit 104 may be readied in advance, and the operation of the stabilization control unit 104 may be controlled from the camera control unit 118 by setting up identification information about the image stabilization function that is activated or deactivated by the stabilization control unit 104.

An aperture and shutter unit 105 has a mechanical shutter that also serves as an aperture, for example. An aperture and shutter drive control unit 106 controls the drive of the aperture and shutter unit 105. A focus unit 107 includes a lens that performs focal adjustment (focus lens). A focus drive control unit 108 controls the drive of the focus unit 107. The zoom unit 101, the correction lens unit 103, the aperture and shutter unit 105, and the focus unit 107 are disposed within an imaging lens that forms a subject image. The imaging lens may be either an interchangeable or fixed type.

An image capture unit 109 has an image sensor, and converts an optical image formed by the imaging lens into an electrical signal. An imaging signal processor 110 converts the electrical signal outputted from the image capture unit 109 into a video signal. A video signal processor 111 processes the video signal outputted from the imaging signal processor 110 according to the intended application. A display unit 112 performs display of a live-view image as needed on the basis of the signal outputted from the video signal processor 111, and functions as an EVF. A power supply unit 113 supplies power to the entire digital still camera 100 as dictated by the application. An external input and output terminal unit 114 inputs and outputs communication signals and video signals from and to an external apparatus, a network, or the like. An operation unit 115 is a group of input devices such as buttons, keys, or a touch panel with which the user can input various commands to the digital still camera 100. A memory unit 116 stores various data such as video information. We will assume that the memory unit 116 has a region used for the buffering of moving pictures, which is different from a region in which captured still pictures and moving pictures are recorded.

An orientation information control unit 117 determines the orientation of the image capture apparatus (whether it is vertical or horizontal), and provides orientation information to the display unit 112 and the video signal processor 111. The camera control unit 118 controls the entire digital still camera 100. The camera control unit 118 may be, for example, a programmable processor such as a CPU, and various functions can be realized in the digital still camera 100 by controlling the various units through execution of control programs stored in the memory unit 116. The imaging signal processor 110 or the video signal processor 111 may be realized by software in the camera control unit 118. Alternatively, at least some of the functions performed by the camera control unit 118 may be realized by hardware such as an ASIC or an electronic circuit.

Next, the principal operation of the digital still camera 100 will be described.

We will assume that the operation unit 115 includes a stabilization switch for activating and deactivating the shake correction function (image stabilization function). When the stabilization switch is used to put the image stabilization function into active mode (shake correction mode or image stabilization mode), the camera control unit 118 directs the stabilization control unit 104 to begin image stabilization operation. Upon receiving the directive to start image stabilization operation, the stabilization control unit 104 performs its image stabilization operation until directed to end the image stabilization operation.

The operation unit 115 also includes an imaging mode selector switch to set the imaging mode. In addition to still picture imaging mode and moving picture imaging mode, the imaging mode can also be set to an imaging mode for automatically recording a moving picture captured for a specific length of time before and after (or only before, or only after) the capture of a still picture (hereinafter referred to as moving picture-added still picture recording mode). The operating conditions of the correction lens drive member (such as an actuator) can be varied according to the imaging mode that has been set.

The operation unit 115 also includes a shutter release button designed so that a first switch SW1 and a second switch SW2 are switched on in that order according to how much the button is depressed. The first switch SW1 is turned on when the shutter release button is pressed by an amount equivalent to an approximately half depth. The second switch SW2 is turned on when the shutter release button is fully pressed. When the first switch SW1 is switched on, the focus drive control unit 108 finds an AF evaluation value from an image that has been processed by the imaging signal processor 110 or the video signal processor 111, and drives the focus unit 107 to perform automatic focus detection by a contrast method. Alternatively, focus detection may be performed by a phase difference detection method using an external sensor or the like. Also, the camera control unit 118, for example, determines the imaging conditions for obtaining the proper amount of exposure from the image processed by the imaging signal processor 110 or the video signal processor 111. When the second switch SW2 is switched on, the aperture and shutter drive control unit 106 drives the aperture and shutter unit 105 according to the determined imaging conditions so that the image capture unit 109 is exposed with light, and the image capture unit 109 outputs an electrical signal obtained by conversion of an optical image. After this, A/D conversion processing, color interpolation processing, white balance adjustment processing, gamma correction processing, and so forth are carried out by the imaging signal processor 110, and the captured image data is stored in the memory unit 116.

The operation unit 115 also includes a moving picture recording switch. When the moving picture recording switch is pressed, the recording of a moving picture in the memory unit 116 is begun, and this recording is ended when the moving picture recording switch is pressed again during recording. The operation unit 115 further includes a reproduction mode selector switch that allows the reproduction mode to be selected. In reproduction mode, image stabilization operation is halted from the camera control unit 118 via the stabilization control unit 104.

The operation unit 115 also includes a zoom switch that changes the zoom ratio of the imaging lens. When a magnification change command is inputted with the zoom switch, the zoom drive control unit 102, which has received the command through the camera control unit 118, drives the zoom unit 101 in the indicated direction.

Next, the image stabilization performed in each imaging mode will be described.

With the digital still camera 100 in this embodiment, the image stabilization function that can be selected is different during still picture capture and during moving picture capture.

During still picture capture, an image stabilization function (first image stabilization mode) that is suited to ordinary hand-held imaging is selected, and the rotational shake that generally occurs during hand-held imaging is corrected. This image stabilization for ordinary imaging is always executed, regardless of the focal distance (angle of view) of the lens or the subject distance. The amount of correction for rotational shake can be calculated using an angular velocity sensor, for example. With an image stabilization function other than the translational shake correction function discussed below, correction is mainly performed only for rotational shake.

A translational shake or parallel shake (hereinafter these two will be referred to collectively as translational shake) correction function is a type of correction function (second image stabilization mode) that provides more powerful correction capability than an image stabilization function used for ordinary imaging under special imaging conditions. It corrects translational shake that tends to occur at a high magnification when the distance from the main subject is short, such as during macro imaging, for example. The amount of correction for translational shake can be calculated on the basis of the acceleration to which the camera is subjected, as measured using an acceleration sensor, for example. With a translational shake correction function, both types of camera shake (rotational shake and translational shake) are corrected. That is, a translational shake correction function is a correction function that corrects not only the rotational shake of the camera, but also the translational shake that occurs when the camera is moved in parallel mainly in a macro region. Here, the translational shake correction function is selected in both imaging modes (during still picture capture and during moving picture capture). The magnification and subject distance corresponding to the macro region can be preset. Thus, there is a translational shake correction function (second image stabilization mode) that can correct the shake component (translational shake) not corrected by the image stabilization function (first image stabilization mode) suited to ordinary hand-held imaging.

Next, the image stabilization function during moving picture capture will be discussed.

During moving picture capture, the image stabilization function (first image stabilization mode) is selected in ordinary hand-held moving picture capture, and the rotational shake that occurs in hand-held imaging when the user holds the camera fairly steady is corrected. Here, with the image stabilization function used for ordinary imaging in moving picture capture, the correction lens is driven under image stabilization parameters that are different from those of the image stabilization function used for ordinary imaging in still picture capture in order to improve the panning display.

A fixed point photography correction function is a type of correction function that provides a more powerful correction capability than an image stabilization function used for ordinary imaging under special imaging conditions. The fixed point photography correction function provides high correction capability in a lower frequency region than that of the image stabilization function used for ordinary imaging, mainly within a small range in which the focal distance of the imaging lens is on the telephoto side, such as when the focal distance is more than or equal to a specific value (such as more than or equal to 50 mm (35 mm equivalent)), and the amount of camera shake is at or below a specific amount. Even if the camera is held steady during fixed point photography, shake such as body shake will occur at a lower frequency than that of camera shake, but since the angle of view is narrower if the focal distance is large, low-frequency shake will be particularly noticeable. Therefore, the correction capability with respect to shake with a low frequency is enhanced by a fixed point photography correction function. With a fixed point photography correction function, rather than preventing the poor panning display, emphasis is placed on correcting body shake (low-frequency shake) when the camera is held steady, making it possible to capture a distant subject in a state in which it is held very still. Thus, a fixed point photography correction function is an image stabilization function that provides a more powerful correction capacity than an image stabilization function used for ordinary imaging, when the amount of shake on the telephoto side is less than a specific amount. Thus, the image capture apparatus in this example has a fixed point photography correction function (second image stabilization mode) that can correct the shake component (low frequency band of shake) not corrected by the image stabilization function (first image stabilization mode) suited to ordinary hand-held imaging.

Various examples of image stabilization function were discussed above, but in addition to those above, other image stabilization functions with different characteristics can be applied as dictated by the imaging situation. That is, there is an image stabilization function used to ordinary hand-held imaging (first image stabilization mode) and a translational shake correction function or fixed point photography correction function that can correct the shake component not corrected in the first image stabilization mode (second image stabilization mode). Optical image stabilization using a correction lens may also be combined with electronic image stabilization, such as varying the image crop position according to shake, or image merging.

Figure 2:
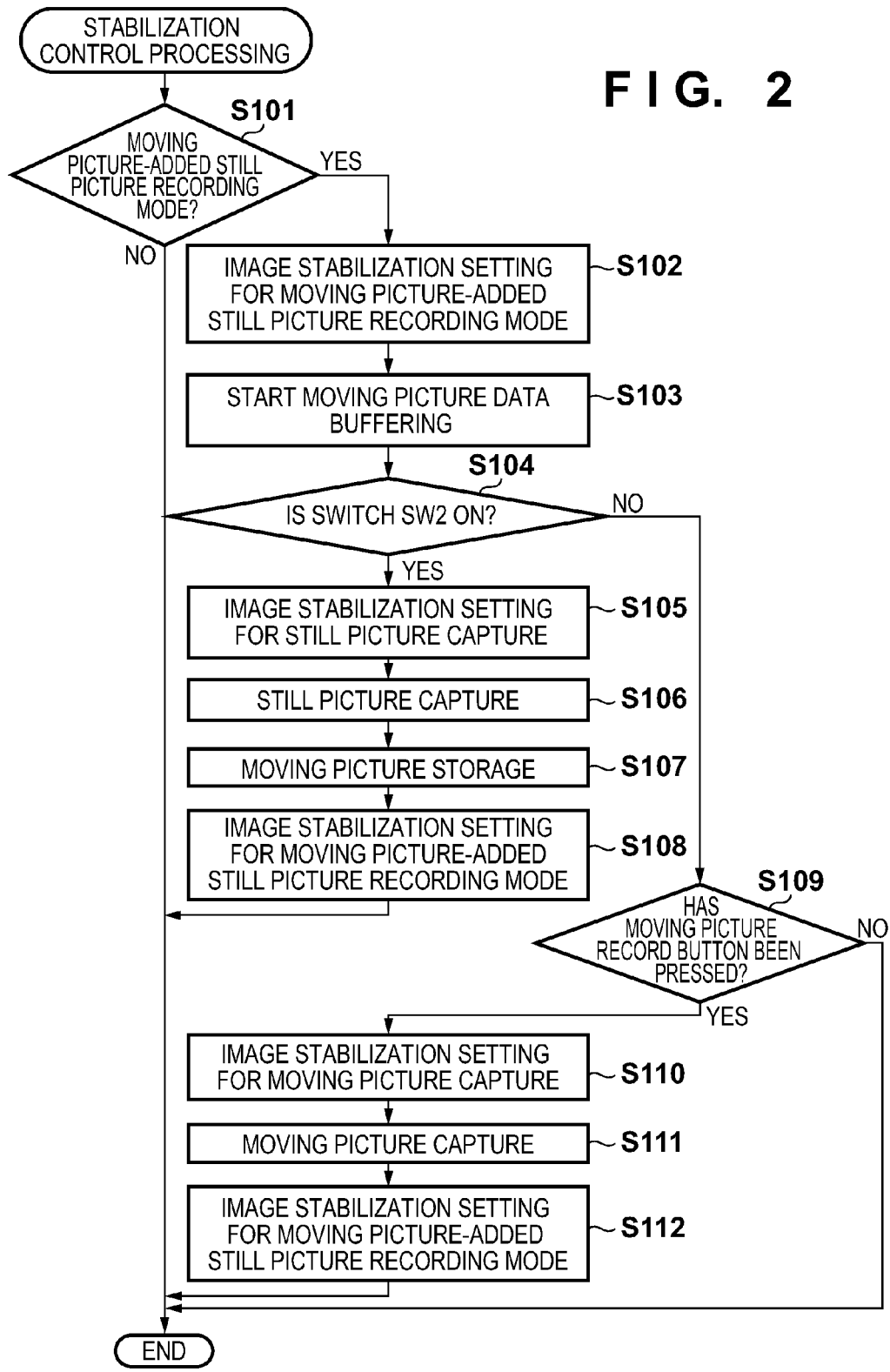
FIG. 2 is a flowchart illustrating stabilization control processing performed by the digital still camera according to an embodiment of the present invention.

FIG. 2 is a flowchart illustrating stabilization control processing performed by the digital still camera 100 of this embodiment.

We will now discuss the stabilization control processing performed in moving picture-added still picture recording mode, in which a moving picture captured for a specific length of time before capture during still picture capture is also recorded.

First, in step S101, the camera control unit 118 determines whether or not the moving picture-added still picture recording mode has been set with the operation unit 115. If the moving picture-added still picture recording mode has not been set, processing is ended, and image stabilization setting appropriate for each imaging mode is performed according to either still picture capture with the release button of the operation unit 115 or moving picture capture with the moving picture recording switch.

More specifically, the camera control unit 118 sets image stabilization parameters (such as panning control or the correction lens drive range) that have been preset according to ordinary still picture capture and moving picture capture in the stabilization control unit 104.

Also, with image stabilization setting for still picture capture, let us assume that translational shake correction is also effective in addition to ordinary rotational shake correction (used for still picture capture). The amount of translational shake increases when the magnification is large (or during imaging in macro imaging mode) and the subject distance is short (such as 50 cm or less) during close-up imaging or the like, so let us assume that correction is effective in cases matching such conditions.

Similarly, with image stabilization setting for moving picture capture, let us assume that a translational shake correction function is also effective in addition to an ordinary rotational shake correction function (for moving picture capture). Furthermore, if the focal distance of the imaging lens is no more than a specific amount on the wide angle side (such as a focal distance of 35 mm or less (35 mm equivalent)), let us assume that it is effective to use large shake correction capable of correcting large shake by expanding the drive range of the correction lens. Let us also assume that a fixed point photography correction function is effective. The conditions for performing large shake correction or fixed point photography correction (subject distance, focal distance of imaging lens, etc.) may be preset, but may also vary.

Next, image stabilization setting for use in moving picture-added still picture recording mode will be described.

Figure 3A:
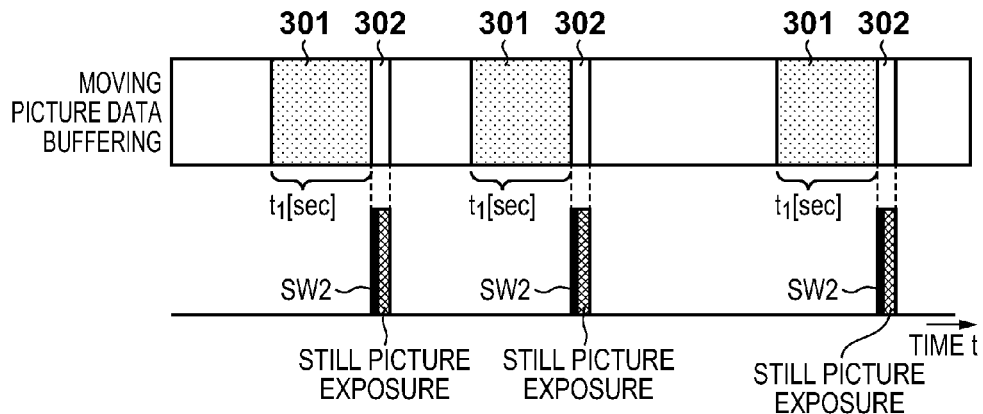
FIGS. 3A to 3C are diagrams illustrating the problems encountered with prior art and the effect of the present invention.

FIG. 3A shows the simplified operation in moving picture-added still picture recording mode. When the mode has been set to moving picture-added still picture recording, moving picture capture is continuously carried out by the image capture unit 109, and the most recent video signal outputted by the imaging signal processor 110 and corresponding to a specific amount of time is continuously buffered in the memory unit 116. When a command is then issued to start still picture capture (when the release switch SW2 is turned on), the camera control unit 118 starts to capture a still picture, and the most recent (for a specific length of time t1, such as 5 seconds) moving picture data buffered in the memory unit 116 is recorded and stored. This corresponds to the time 301 in FIG. 3A, and moving picture buffering is performed here. During exposure, moving picture buffering stops, and the buffering of the moving picture is resumed once still picture exposure is finished. This corresponds to the time 302 in FIG. 3A, and moving picture buffering is stopped here.

During buffering, if translational shake correction is performed during close-up imaging, or if fixed point photography is performed when imaging is done at the telephoto end, for example, such as during ordinary moving picture capture, then the amount of correction will be larger than during just ordinary rotational shake correction, so the correction lens will tend to move to the movable limit. Also, in moving picture-added still picture recording mode, from what point in time the temporarily saved data that is being buffered is recorded as a moving picture is not certain until the release switch SW2 is turned on.

Figure 3B:
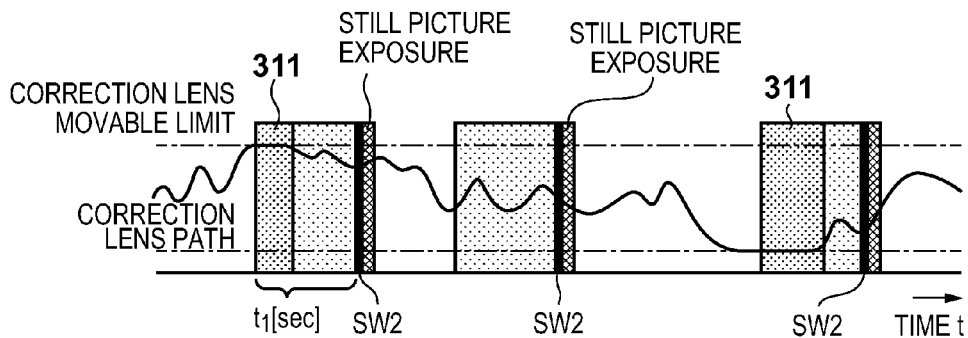

In this situation, if we perform a translational shake correction or fixed point photography correction that strengthens the effect of image stabilization control, then there is a greater probability that the correction lens will have moved to the movable limit at the start of moving picture recording. 311 in FIG. 3B shows the segment in which the correction lens has moved to the movable limit and stopped there.

When the correction lens has moved to the movable limit, there is a limit to how much shake can be corrected. For example, if moving picture recording was started somewhere in 311 in FIG. 3B, then the captured moving picture will be recorded in a state of inadequate image stabilization capability.

Returning to FIG. 2, if the mode has been set to moving picture-added still picture imaging in step S101, the camera control unit 118 performs image stabilization setting for use in moving picture-added still picture recording mode in step S102. More specifically, the camera control unit 118 sets the stabilization control unit 104 so as to execute image stabilization (such as panning control and the movable range) during ordinary moving picture recording. However, the stabilization control unit 104 is set so as not to execute translational shake correction or fixed point photography correction (second image stabilization mode) capable of correcting the shake component not corrected during ordinary imaging, that is, which strengthens the image stabilization effect.

Figure 3C:
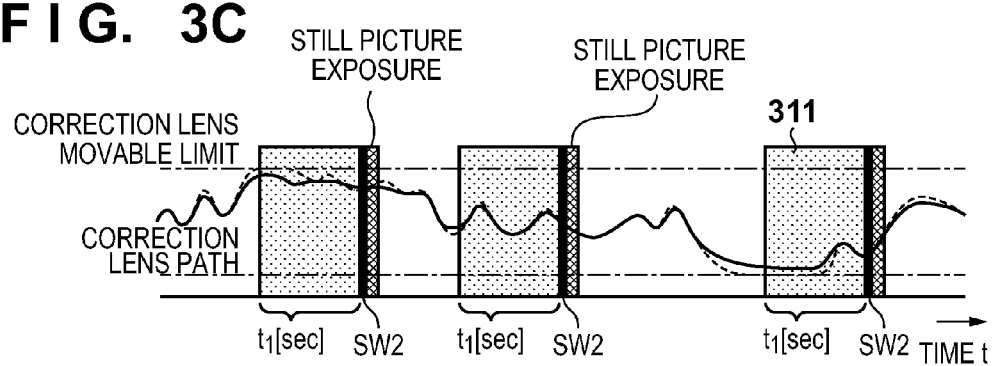

Consequently, as shown in FIG. 3C, the probability that the correction lens will move to the movable limit during the buffering of moving picture data can be reduced.

After the setting of the image stabilization parameters, the camera control unit 118 begins the buffering of moving picture data (step S103). In step S104 the camera control unit 118 determines whether or not the release switch SW2 has been turned on, and if it has been, in step S105 the camera control unit 118 sets the image stabilization parameters used for still picture capture in the stabilization control unit 104. More specifically, the stabilization control unit 104 is set so as to perform translational shake correction according to the subject distance (for close-ups such as in macro imaging), in addition to the image stabilization parameters used for ordinary still picture recording. The camera control unit 118 then performs still picture imaging processing (step S106). At the same time, the camera control unit 118 records and stores moving picture data corresponding to a point going back a specific time t1 (such as 5 seconds) from the timing when the release switch SW2 was turned on, out of the moving picture data buffered in the memory unit 116. If the region in which the moving picture data is buffered is different from the region in which the moving picture is recorded and stored, the camera control unit 118 moves the data from one region to the other.

Once the camera control unit 118 records and stores a still picture and a moving picture, the processing proceeds to step S108, the stabilization control unit 104 is returned to image stabilization setting for use in moving picture-added still picture recording mode, and buffering is continued.

In step S104, if the release switch SW2 has not been turned on, the camera control unit 118 determines whether or not the moving picture record button has been pressed in step S109. If the moving picture record button has been pressed, in step S110 the camera control unit 118 sets the image stabilization parameters for moving picture capture in the stabilization control unit 104, and in step S111 moving picture capture and recording are begun.

If pressing of the moving picture record button again is detected during moving picture recording, the camera control unit 118 ends moving picture recording, and the processing proceeds to step S112. In step S112 the camera control unit 118 returns the stabilization control unit 104 to image stabilization setting for use in moving picture-added still picture recording mode, and restarts the buffering of moving picture data.

As discussed above, when a moving picture that is to be recorded along with a still picture is buffered, the image stabilization function is set so as not to use an image stabilization function that provides image stabilization that is more powerful than that of an ordinary image stabilization function under specific imaging conditions. Consequently, a captured moving picture can be recorded in a stable image stabilization capability.

Other Embodiments

A digital still camera capable of capturing both still pictures and moving pictures was described as an image capture apparatus in the above embodiment, but this is not the only option. For example, the present invention can also be applied to an electronic device such as a game device having an imaging function, a communication device such as a portable telephone having an imaging function, or the like, and the same effects will be obtained in that case.

Also, only a lens shift type of image stabilization mechanism was described in the above embodiment, but the principle behind the present invention can be similarly applied to another optical image stabilization mechanism, such as a sensor shift type of image stabilization mechanism.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-286631, filed on Dec. 27, 2011, which is hereby incorporated by reference herein its entirety.

What is claimed is:

1. An image capture apparatus having an image capture mode in which a moving picture, captured for a period of time which comprises at least one of a duration of a specific length of time before capture of a still picture and a duration of the specific length of time after capture of the still picture, is recorded along with the still picture, the apparatus comprising:
    a memory unit that buffers the moving picture captured for the specific length of time; and
    an image stabilization control unit that performs image stabilization with an image stabilization unit according to shake of the apparatus, the image stabilization control unit having a first image stabilization mode and a second image stabilization mode,
    wherein the image stabilization control unit performs image stabilization without using the second image stabilization mode when the moving picture is being buffered by the memory unit, and
    wherein image shake caused by rotational shake is corrected in the first image stabilization mode, and in the second image stabilization mode, image shake caused by translational shake in a direction orthogonal to the optical axis is corrected in addition to the rotational shake.

2. An image capture apparatus having an image capture mode in which a moving picture, captured for a period of time which comprises at least one of a duration of a specific length of time before capture of a still picture and a duration of the specific length of time after capture of the still picture, is recorded along with the still picture, the apparatus comprising:
    a memory unit that buffers the moving picture captured for the specific length of time; and
    an image stabilization control unit that performs image stabilization with an image stabilization unit according to shake of the apparatus, the image stabilization control unit having a first image stabilization mode and a second image stabilization mode,
    wherein the image stabilization control unit performs image stabilization without using the second image stabilization mode when the moving picture is being buffered by the memory unit, and
    wherein the shake component to be corrected in the second image stabilization mode has a wider frequency band than the shake component to be corrected in the first image stabilization mode.

3. An image capture apparatus having an image capture mode in which a moving picture, captured for a period of time which comprises at least one of a duration of a specific length of time before capture of a still picture and a duration of the specific length of time after capture of the still picture, is recorded along with the still picture, the apparatus comprising:
    a memory unit that buffers the moving picture captured for the specific length of time; and
    an image stabilization control unit that performs image stabilization with an image stabilization unit according to shake of the apparatus, the image stabilization control unit having a first image stabilization mode and a second image stabilization mode in which a shake component not corrected in the first image stabilization mode can be corrected,
    wherein the image stabilization control unit performs image stabilization without using the second image stabilization mode when the moving picture is being buffered by the memory unit, and
    wherein the second image stabilization mode is a translational shake correction function in which translational shake of the apparatus is corrected when the subject distance and the magnification of an imaging optical system are in a predetermined macro region, or a fixed point photography correction function in which the correction capability is enhanced for shake with a low frequency when the focal distance of the imaging optical system is more than or equal to a specific value.

4. A control method for an image capture apparatus comprising memory unit that buffers a moving picture captured for a specific length of time, and having an image capture mode in which a moving picture, captured for a period of time which comprises at least one of a duration of a specific length of time before capture of a still picture and a duration of the specific length of time after capture of the still picture, is recorded along with the still picture, the control method comprising:
    an image stabilization control step in which image stabilization is performed with image stabilization unit according to shake of the apparatus,
    image stabilization control step, of a first image stabilization mode and a second image stabilization mode, image stabilization is performed without using the second image stabilization mode when the moving picture is being buffered into the memory unit, and
    wherein image shake caused by rotational shake is corrected in the first image stabilization mode, and in the second image stabilization mode, image shake caused by translational shake in a direction orthogonal to the optical axis is corrected in addition to the rotational shake.

5. A control method for an image capture apparatus comprising memory unit that buffers a moving picture captured for a specific length of time, and having an image capture mode in which a moving picture, captured for a period of time which comprises at least one of a duration of a specific length of time before capture of a still picture and a duration of the specific length of time after capture of the still picture, is recorded along with the still picture, the control method comprising:
an image stabilization control step in which image stabilization is performed with image stabilization unit according to shake of the apparatus, wherein
in the image stabilization control step, of a first image stabilization mode and a second image stabilization mode, image stabilization is performed without using the second image stabilization mode when the moving picture is being buffered into the memory unit,
wherein the shake component to be corrected in the second image stabilization mode has a wider frequency band than the shake component to be corrected in the first image stabilization mode.

6. A control method for an image capture apparatus comprising memory unit that buffers a moving picture captured for a specific length of time, and having an image capture mode in which a moving picture, captured for a period of time which comprises at least one of a duration of a specific length of time before capture of a still picture and a duration of the specific length of time after capture of the still picture, is recorded along with the still picture, the control method comprising:
an image stabilization control step in which image stabilization is performed with image stabilization unit according to shake of the apparatus,
wherein in the image stabilization control step, of a first image stabilization mode and a second image stabilization mode in which a shake component not corrected in the first image stabilization mode can be corrected, image stabilization is performed without using the second image stabilization mode when the moving picture is being buffered into the memory unit,
wherein the second image stabilization mode is a translational shake correction function in which translational shake of the apparatus is corrected when the subject distance and the magnification of an imaging optical system are in a predetermined macro region, or a fixed point photography correction function in which the correction capability is enhanced for shake with a low frequency when the focal distance of the imaging optical system is more than or equal to a specific value.

7. An image capture apparatus having an image capture mode in which a moving picture, captured for a period of time which comprises at least one of a duration of a specific length of time before capture of a still picture and a duration of the specific length of time after capture of the still picture, is recorded along with the still picture, the apparatus comprising:
a memory unit that buffers the moving picture captured for the specific length of time; and
an image stabilization control unit that performs image stabilization with an image stabilization unit according to shake of the apparatus, the image stabilization control unit having a first image stabilization mode and a second image stabilization mode,
wherein the image stabilization control unit performs image stabilization using the first image stabilization mode when the moving picture is being buffered by the memory unit,
wherein the image stabilization control unit performs image stabilization using the second image stabilization mode when the still picture is being buffered by the memory unit,
wherein image shake caused by rotational shake is corrected in the first image stabilization mode, and in the second image stabilization mode, image shake caused by translational shake in a direction orthogonal to the optical axis is corrected in addition to the rotational shake.

8. The apparatus according to claim 7, wherein the image stabilization control unit uses the first image stabilization mode when the moving picture is being buffered by the memory unit, and uses the second image stabilization mode when a still picture is captured.

9. The apparatus according to claim 7, wherein the image stabilization control unit performs the image stabilization by controlling the position of the image stabilization unit according to shake of the apparatus.

10. The apparatus according to claim 9, wherein the image stabilization unit is a correction lens or an image sensor.

11. An image capture apparatus having an image capture mode in which a moving picture, captured for a period of time which comprises at least one of a duration of a specific length of time before capture of a still picture and a duration of the specific length of time after capture of the still picture, is recorded along with the still picture, the apparatus comprising:
a memory unit that buffers the moving picture captured for the specific length of time; and
an image stabilization control unit that performs image stabilization with an image stabilization unit according to shake of the apparatus, the image stabilization control unit having a first image stabilization mode and a second image stabilization mode,
wherein the image stabilization control unit performs image stabilization using the first image stabilization mode when the moving picture is being buffered by the memory unit,
wherein the image stabilization control unit performs image stabilization using the second image stabilization mode when the still picture is being buffered by the memory unit,
wherein the shake component to be corrected in the second image stabilization mode has a wider frequency band than the shake component to be corrected in the first image stabilization mode.

12. The apparatus according to claim 11, wherein the image stabilization control unit uses the first image stabilization mode when the moving picture is being buffered by the memory unit, and uses the second image stabilization mode when a still picture is captured.

13. The apparatus according to claim 11, wherein the image stabilization control unit performs the image stabilization by controlling the position of the image stabilization unit according to shake of the apparatus.

14. A control method for an image capture apparatus comprising memory unit that buffers a moving picture captured for a specific length of time, and having an image capture mode in which a moving picture, captured for a period of time which comprises at least one of a duration of a specific length of time before capture of a still picture and a duration of the specific length of time after capture of the still picture, is recorded along with the still picture, the control method comprising:
an image stabilization control step in which image stabilization is performed with image stabilization unit according to shake of the apparatus, wherein
in the image stabilization control step, of a first image stabilization mode and a second image stabilization mode, image stabilization is performed using the first image stabilization mode when the moving picture is being buffered into the memory unit, image stabilization is performed using the second image stabilization mode when the still picture is being buffered into the memory unit, wherein image shake caused by rotational shake is corrected in the first image stabilization mode, and in the second image stabilization mode, image shake caused by translational shake in a direction orthogonal to the optical axis is corrected in addition to the rotational shake.

15. The control method according to claim 14, wherein in the image stabilization control step, the first image stabilization mode is used when the moving picture is being buffered into the memory unit, and the second image stabilization mode is used when a still picture is captured.

16. A control method for an image capture apparatus comprising memory unit that buffers a moving picture captured for a specific length of time, and having an image capture mode in which a moving picture, captured for a period of time which comprises at least one of a duration of a specific length of time before capture of a still picture and a duration of the specific length of time after capture of the still picture, is recorded along with the still picture, the control method comprising:

an image stabilization control step in which image stabilization is performed with image stabilization unit according to shake of the apparatus, wherein in the image stabilization control step, of a first image stabilization mode and a second image stabilization mode, image stabilization is performed using the first image stabilization mode when the moving picture is being buffered into the memory unit, image stabilization is performed using the second image stabilization mode when the still picture is being buffered into the memory unit, wherein the shake component to be corrected in the second image stabilization mode has a wider frequency band than the shake component to be corrected in the first image stabilization mode.

* * * * *